(12) United States Patent
Giannetti

(10) Patent No.: US 8,924,841 B2
(45) Date of Patent: Dec. 30, 2014

(54) VARIABLE DATA PRINTING

(75) Inventor: Fabio Giannetti, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2152 days.

(21) Appl. No.: 11/411,687

(22) Filed: Apr. 25, 2006

(65) Prior Publication Data

US 2006/0248454 A1    Nov. 2, 2006

(30) Foreign Application Priority Data

Apr. 30, 2005    (GB) .................................. 0508903.2

(51) Int. Cl.
| | | |
|---|---|---|
| *G06F 17/24* | (2006.01) | |
| *G06F 17/21* | (2006.01) | |
| *G06F 17/22* | (2006.01) | |
| *G06F 17/30* | (2006.01) | |

(52) U.S. Cl.
CPC ............ *G06F 17/248* (2013.01); *G06F 17/212* (2013.01); *G06F 17/2247* (2013.01)
USPC ........... 715/209; 715/221; 715/229; 715/230; 715/231

(58) Field of Classification Search
USPC .................. 715/209, 221, 226, 229, 230, 231
See application file for complete search history.

(56) References Cited

U.S. PATENT DOCUMENTS

| | | | | |
|---|---|---|---|---|
| 6,330,071 | B1 * | 12/2001 | Vidyanand ................... | 358/1.15 |
| 6,535,294 | B1 * | 3/2003 | Arledge et al. .............. | 358/1.15 |
| 6,826,727 | B1 * | 11/2004 | Mohr et al. ................... | 715/235 |
| 6,993,759 | B2 * | 1/2006 | Aptus et al. .................. | 717/170 |
| 7,278,094 | B1 * | 10/2007 | Dreyer et al. ................. | 715/234 |
| 7,375,842 | B2 * | 5/2008 | Kloosterman et al. ........ | 358/1.18 |
| 2002/0049702 | A1 * | 4/2002 | Aizikowitz et al. ............... | 707/1 |

FOREIGN PATENT DOCUMENTS

| | | |
|---|---|---|
| EP | 0837401 | 2/2003 |
| EP | 1387290 | 2/2004 |
| GB | 2346988 | 8/2000 |
| GB | 2407676 | 5/2005 |

OTHER PUBLICATIONS

Joe Habraken, "Sams Teach Yourself Microsoft Publisher 2000 in 10 minutes", publisher: Sams, published: May 6, 1999, pp. 1-3.*

* cited by examiner

*Primary Examiner* — Stephen Hong
*Assistant Examiner* — Wilson Tsui

(57) ABSTRACT

Methods and arrangements are provided for generating, rendering and/or printing documents from a variable-data printing document template which defines multiple document versions, each document version may be selectable in response to input selection data. There is provided a way of producing of variable-data publishing (VDP) documents for Digital Publishing (DP) that rely upon complex document designs containing copy-holes which may be expressed according to a set of options, one of which being non-existence of the copy-hole.

21 Claims, 5 Drawing Sheets

VARIABLE DATA PRINTING

RELATED APPLICATIONS

This application for letters patent is related to and claims the benefit of an earlier filing date and right of priority of foreign filed patent application GB0508903.2, filed in the United Kingdom on Apr. 30, 2005, which is also incorporated herein by reference.

BACKGROUND

The advent of digital technology means there are now more ways than ever to communicate. This increased ability to send and receive data significantly expands an organisation's ability to deliver information via the Internet and advanced printing and publishing systems. The combination of Web technologies and digital printing can reduce communication costs, help businesses acquire new customers, increase the loyalty and buying habits of current customers, enable new revenue opportunities, and give birth to new business models.

By gathering the right data and utilizing digital publishing an organisation can deliver information customized to their customer's wishes, when they need it. Consequently, it is no surprise that personalized, highly targeted collateral and direct marketing are widely accepted as key factors in achieving higher response rates, increased efficiencies, and improved marketing.

Digital publishing solutions enable real-time targeted marketing (RTTM) by enabling the ability to create, print on demand, and distribute marketing collateral such as brochures, presentations, direct mail and point of sale materials that are customised to each audience member in a cost effective manner. However, the value of RTTM extends beyond improved marketing response rates by helping reduce costs and drive incremental revenue.

Variable-data printing (VDP) is a form of on-demand printing in which all the documents in a print run are similar but not identical. A mail merge is a simple form of VDP. For example, personalized letters may have the same basic layout, but there will be a different name and address on each letter. Variable-data printing can now go far beyond printing different names and addresses on a document. There are systems that enable the user to insert different graphics into a document, change the layout and/or the number of pages, print a unique bar code on each document and more.

A prominent example of VDP usage is how credit-card companies analyze the buying histories of their customers and send information about specific products and services related to the ascertained customer interests. VDP systems are used to print these customized advertisements.

The concept of creating variable-data documents has also been extended to non-paper documents such as PDF documents and HTML documents. The term variable-data publishing (VDP) encompasses both paper documents and on-line documents.

Due to the resultant demands for the layout, content and personalisation of documents, high-volume print jobs are becoming more complex. In addition to this, pressure on the operators at the machines is increasing.

Personalized Print Markup Language (PPML) is the print industry's answer to these issues. PPML is a new, Extensible Markup Language (XML)-based, industry standard print language for variable data publishing (VDP). It enables high-speed, efficient printing and production of documents with reusable and variable content.

The PPML language uses XML, the Extensible Markup Language, as its syntactical base, giving it an affinity to many Web-based applications, and can access page content files generated in many different formats. Because PPML is independent of printer language, PPML can be used to create output that will support any printer language. Any PPML-compliant printer with the appropriate features will accept the same print file, no matter what software created it and what printer generates the output. Thus, applications will ultimately range from desktop to high-end digital printing presses.

In a PPML workflow, there is a PPML Producer and a PPML Consumer. A PPML Producer is anything that produces PPML code (typically an application or a driver). A PPML Consumer is a device, process, or system that reads and interprets PPML code (typically a printer or Digital Front End).

The generation of VDP collateral material for Digital Publishing requires the generation of templates addressing the support for variable content and dynamic layout. Consequently, there now exists a version of PPML for variable data called PPML/T. The 'T' part of PPML/FT corresponds to a template which is sent to the press where it can be merged with a database and a library of repeated elements to produce a PPML document.

A Theme is a concept that enables different versions of a document to be generated, for example documents in different languages. These themes are implemented using multiple templates, particularly if there are variations between the copy-hole layouts. To support a plurality of copy-holes it is necessary to provide alternative templates, each with a unique combination, and select among them at the time of merging the variable data to produce personalized documents. Thus, it is problematic to maintain consistency across all templates when a change needs to be made.

For example, if a logo needs to be replaced or slightly moved, the Graphic Artist (GA) needs to repeat this operation for all templates with the various combinations of copy-holes. Clearly, this will not scale when the number of copy-holes, and subsequent number of templates, is more than a few.

Prior solutions based on PPML/T can allow a copy-hole to be available or not, but those solutions are not based on the 'Theme' paradigm. Consequently, the GA has no control over the generation of the variants, since these are hand-coded within the exported format of PPML/T.

BRIEF DESCRIPTION OF THE DRAWINGS

Embodiments will now be described, purely by way of example, with reference to the accompanying drawings, in which.

DETAILED DESCRIPTION

Examples of the invention include methods, systems and computer program products for generating, rendering and printing a document, the document comprising a variable-data printing document template which defines multiple document versions, with each document version being selectable in response to input selection data.

A new concept of document variant is introduced which can be used to enhance the current RTTM PPML/T format by including support for dynamic themes. A dynamic theme provides the possibility of expressing a copy-hole (a document portion comprising content which is variable) as part of a set of options, one of which being non-existence of the copy-hole.

Accordingly, the methods and arrangements herein enable the production of variable-data publishing (VDP) documents for Digital Publishing (DP) that rely upon complex document designs containing dynamic themes. Such dynamic themes, which enable copy-holes to appear and disappear based upon business rules, make the document template very flexible. Such dynamic themes, which enable copy-holes to appear and disappear based upon business rules, make the document template very flexible.

Viewing the different document versions derived from the template can be carried out using the standard "layer" function of design packages.

Figure 1:
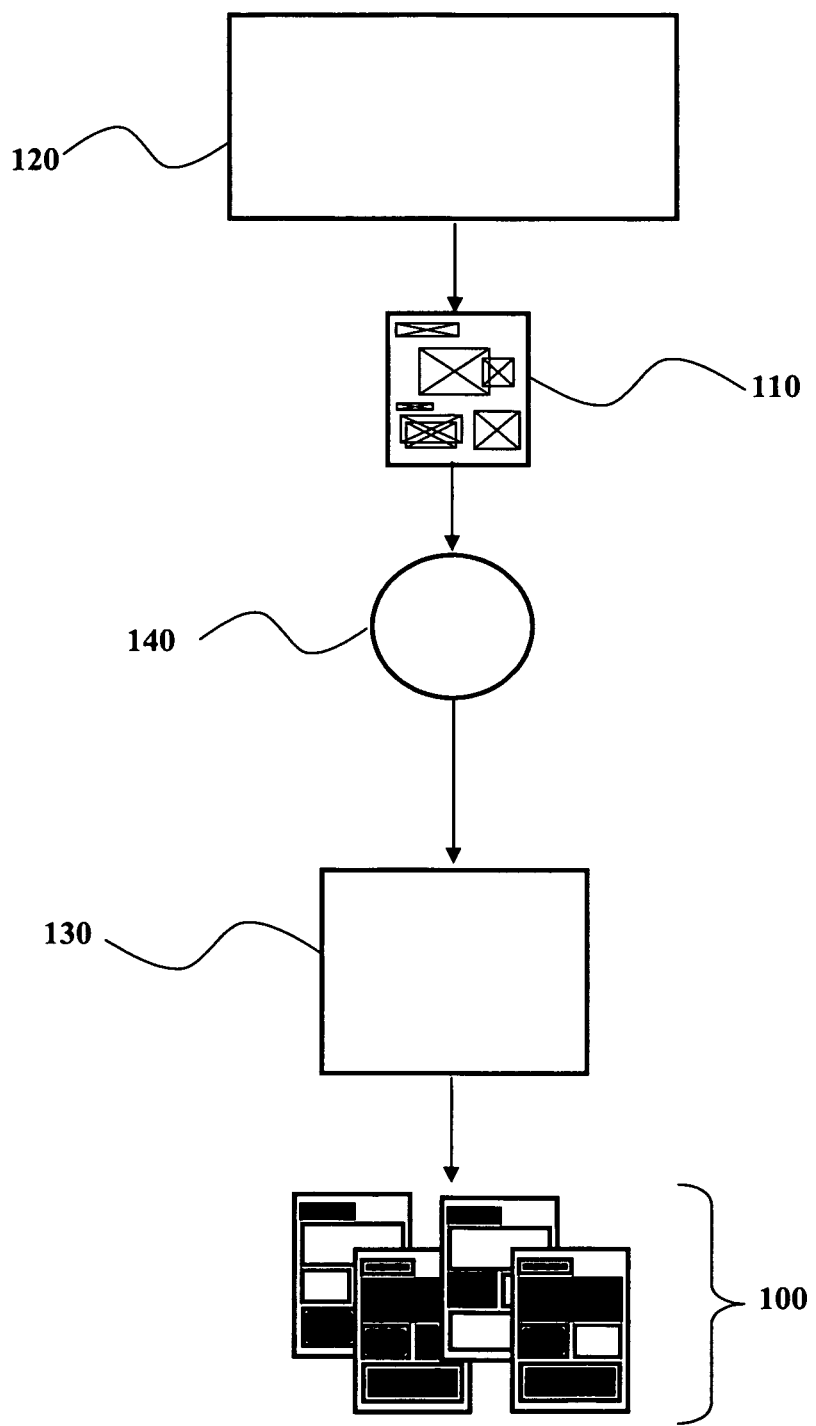
FIG. 1 shows an overview of a system for printing variable-data publishing documents from a template, the template defining multiple document versions, with each document version being selectable in response to input selection data, in accordance with an exemplary embodiment.

FIG. 1 shows an overview of a system for printing VDP documents 100 from a template 110, the template defining multiple document versions, with each document version being selectable in response to input selection data.

The system comprises a producer 120 and a consumer 130. The producer 120 produces VDP templates and documents for publishing by the consumer 130, the templates and documents most commonly being in PPML format. Typically, the producer 120 includes a computer based design system or graphic tool with which the document template 110 is designed.

Once the VDP template 110 is finalised, the template 110 is passed to the consumer 130, often via a marketing manager 140. In response to data provided by the marketing manager 140, the consumer 130 publishes documents 100 defined by the template 110. The consumer 130 provides means of publishing documents 100 such as a printer or digital press.

Figure 2:
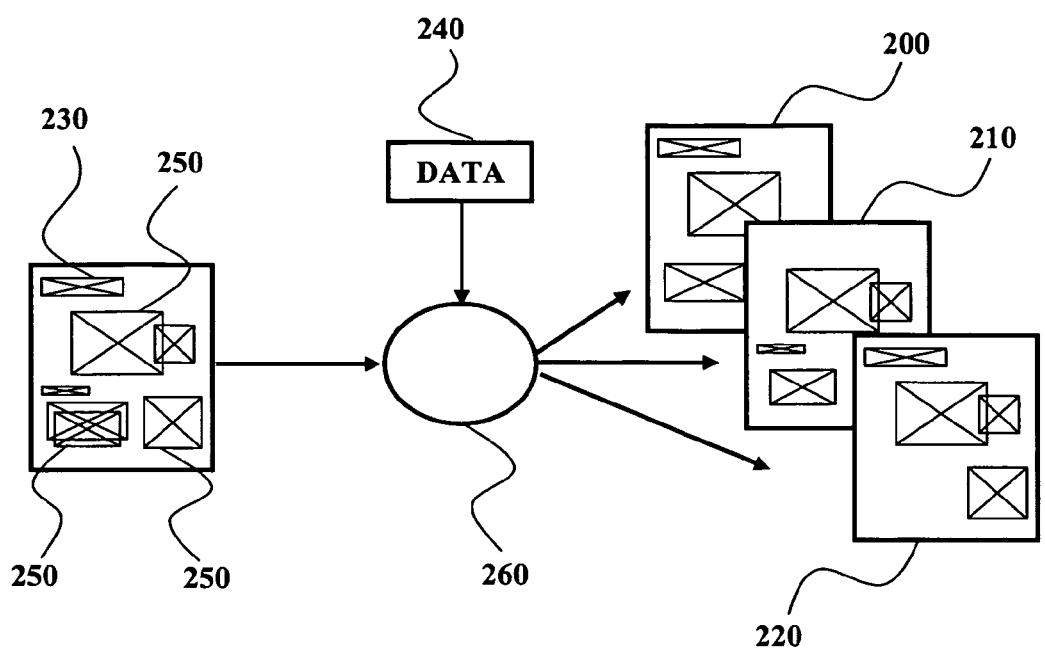
FIG. 2 shows the process of generating documents for printing from a template, the template defining multiple document versions, with each document version being selectable in response to input selection data, in accordance with an exemplary embodiment.

Referring to FIG. 2, the process of generating documents 200,210,220 for printing from a document template 230 which defines a document containing variable content in response to input data 240 is shown. The document template 230 comprises a layout of copy-holes 250 containing content which is variable in response to the input data 240.

The document template 230 includes the concept of a dynamic theme. A dynamic theme provides the possibility of expressing a copy-hole 250 as part of a set of options, one of which being non-existence of the copy-hole 250. For example, a dynamic theme can enable copy-holes to appear and disappear based upon rules and applied data 240.

The document template 230 is passed to a processor 260 to be merged with input data 240. The input data 240 may be a form of collated data such as, purely by way of an example, a table, a database or a spreadsheet, which defines each document version and the content to be merged into the copy-hole 250 of the document template 230 by the processor 260. The processor 260 merges data 240 with the document template 230 and renders the result to produce a document 200 comprising content in response to the data 240.

The input data can be represented using Extensible Markup Language (XML). Since XML is a cross-platform, software and hardware independent tool for transmitting information, data represented as XML can be exchanged between incompatible systems. Accordingly, use of XML can greatly reduce the complexity of exchanging the data 240.

From a single document template 230, the processor 260 is able to merge the input data 240 to create a plurality of documents 200,210,220 which all contain unique layouts and content.

Figure 3:
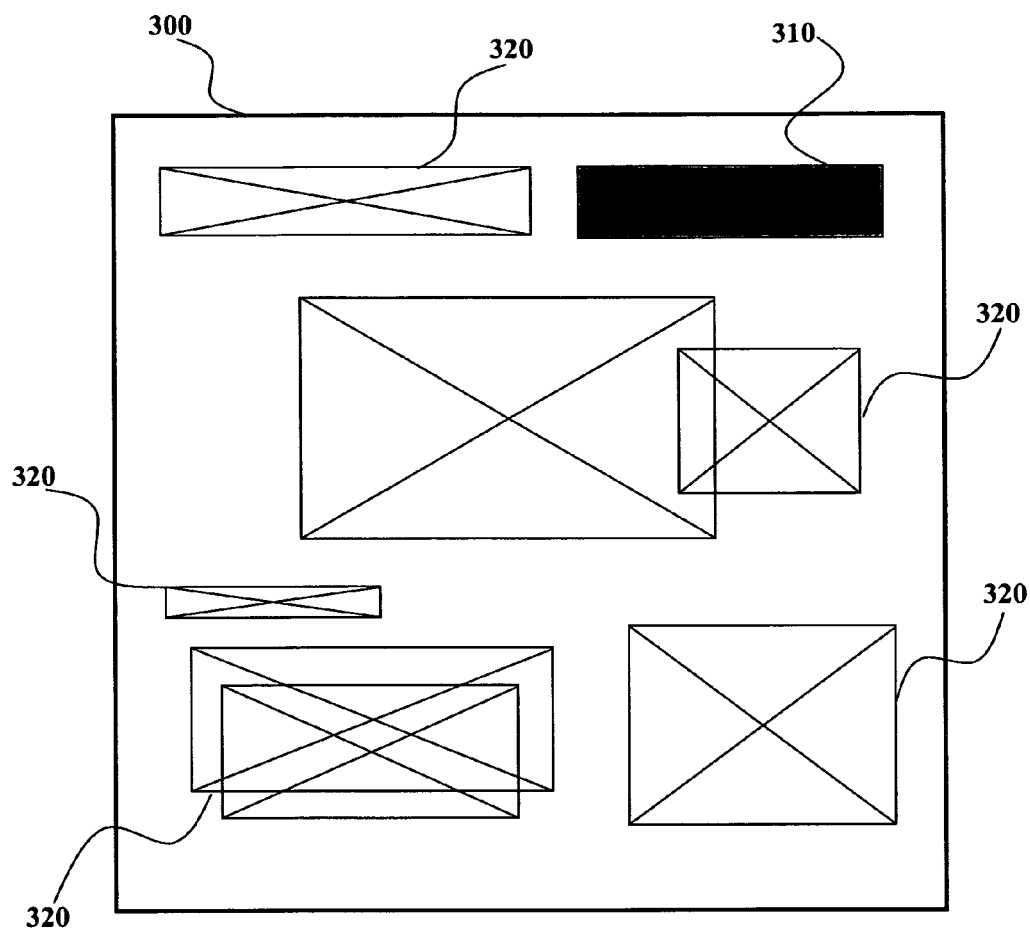
FIG. 3 shows the concept of a template defining multiple document versions, the template having a layout of document portions, at least one of the document portions including a variable portion containing content which is variable, in accordance with an exemplary embodiment.

Referring to FIG. 3, complex document designs can consist of a document template 300 comprising a section of fixed content 310 and a copy-hole 320.

A copy-hole 320 is a document portion comprising content which is variable. In accordance with one aspect of the present invention, a new concept of document variant is introduced by including support for dynamic themes. A dynamic theme provides the possibility of expressing a copy-hole 320 as part of a set of options, one of which being non-existence of the copy-hole.

Figure 4:
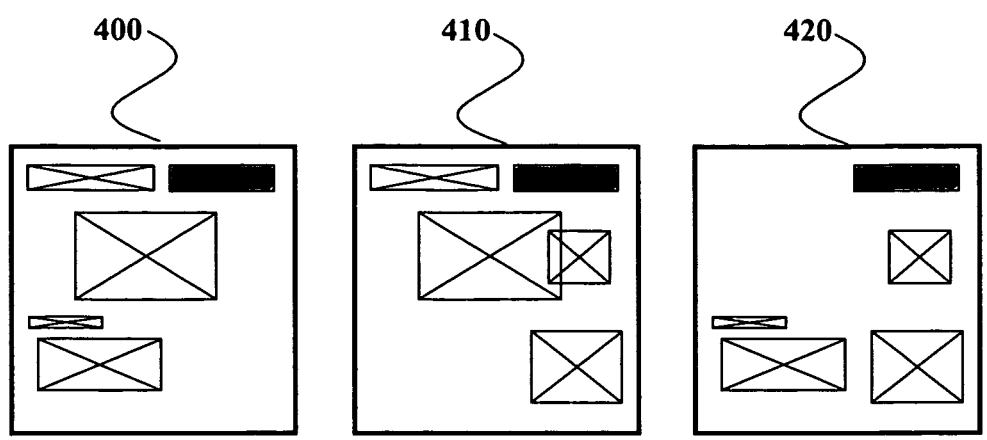
FIG. 4 shows multiple templates, which are avoided by the template of FIG. 3, in accordance with an exemplary embodiment.

Currently, it is impossible to have such a feature using themes without requiring multiple templates 400,410,420, as shown in FIG. 4, to accommodate all the variations of the copy-hole 320 layouts. To support a plurality of copy-holes 320 it has been necessary to provide alternative templates 400,410,420, each with a unique combination of copy-holes, and select among them at the time of merging the variable data to produce personalized documents. Thus, it is problematic to maintain consistency across all templates 400,410,420 when a change is required.

In certain embodiments a document template 300 is provided that allows a Graphic Artist (GA) to design the layout of the fixed content 310 and the copy-holes 300 in a single template 300. It is also possible to temporarily enable or disable some of the copy-holes providing means of visualizing document variants at design-time in the single document template 300.

The GA can also control the positioning, size and content of the copy-holes 320 similarly to all the other parts of the design. Thus, the GA may predict, at design time, the final document instance appearance. The template 300 shows all the copy-holes 320 so that the GA can position, re-size and accommodate them.

The template 300 of FIG. 3 thus represents the view seen by the GA. The GA works on the template 300 using a design tool with standard design functions that enable the copy holes to be positioned and manipulated as required.

In the case that the template 300 has a considerable number of copy-holes 320, embedding all of them into a single template can become difficult for the GA to represent.

By adopting the approach of layering copy-holes 320, they can be positioned such that they overlap as demonstrated in FIG. 3. Copy-holes can be "temporarily" switched off so that the GA can concentrate on a particular layout of copy-holes 320. Any appropriate combination of copy-holes can be enabled or 'turned on' at design-time to allow the GA to visualise a particular document layout or effect, and this can be carried out using the "layers" tool of the document editing software package.

Document layouts corresponding to the templates 400, 410, 420, each with a unique combination of copy-holes, are attained by enabling/disabling some of the dynamic theme's options and thus modifying the expression of the copy-holes 320.

Once all of the copy holes 320 have been created and correctly positioned, the GA registers them as part of the Dynamic Theme. Themes are supported using a special paradigm in a Personalized Print Markup Language Template (PPML/T). When the GA introduces the options they give a symbolic name to the options and link an image or text to it. For example, the GA may wish to make an image appear in a copy-hole on the left hand side of the document by linking the image to an option named 'Left'.

For example, the selection between the options can then be performed by simply using a <xsl:choose> construct expressed as follows:

```
<xsl:choose>
<xsl:when test="(Points='Left')">
    <!-- grouped copy holes -->
    <ppml:MARK Position="72.000 92.000">
        <ppml:OCCURRENCE_REF Environment="DM"
        Ref="LeftPoints.jpg" />
    <ppml:MARK>
    <ppml:MARK Position="93.000 125.000">
        <ppml:VIEW>
            <ppml:TRANSFORM Matrix="1 0 0 1 0 0" /
        <ppml:VIEW>
        <ppml:OBJECT Position="0 0">
            <ppml:SOURCE Dimensions="48.9976 40"
            Format="text/xml">
                <ppml:INTERNAL_DATA>
                    <fo:root>
                </ppml:INTERNAL_DATA>
            </ppml:SOURCE>
            <ppml:VIEW />
        </ppml:OBJECT>
    </ppml:MARK>
</xsl:when>
<xsl:when test="(Points='Right')">
    <!-- grouped copy holes -->
    <ppml:MARK Position="423.000 259.000">
        <ppml:OCCURRENCE_REF Environment="DM"
        Ref="RightPoints.jpg" />
    <ppml:MARK>
    <ppml:MARK Position="464.00 339.9919">
        <ppml:VIEW>
            <ppml:TRANSFORM Matrix="1 0 0 1 0 0" /
        <ppml:VIEW>
        <ppml:OBJECT Position="0 0">
            <ppml:SOURCE Dimensions="48.9976 40"
            Format="text/xml">
                <ppml:INTERNAL_DATA>
                    <fo:root>
                </ppml:INTERNAL_DATA>
            </ppml:SOURCE>
            <ppml:VIEW />
        </ppml:OBJECT>
    </ppml:MARK>
</xsl:when>
```

The above example demonstrates the code to describe two groups of copyholes. Group one contains an image, defined by the file LeftPoints.jpg, which is a reusable object marked with an (X,Y) coordinate position of (72.0, 92.0). The group also contains a portion of text defined by the <fo:root> tag, this has not been expanded to show the actual text content. Similarly, group 2 contains an image, defined by the file RightPoints.jpg, with a coordinate position of (423.0, 259.0), and a portion of text defined by the second <fo:root> tag. These jpg files are reusable objects.

The program code uses standard XSL tags as defined by the World Wide Web Consortium (W3C). These will be well known to those skilled in the art and accordingly are not described in detail.

The <xsl:when> test is used to establish whether the respective grouped copy-holes should be expressed or not. For example, group 1 will be selected for template if the value of 'Points' equals 'Left'. Thus, the <xsl:choose> construct simply selects different theme options in response to external data.

By registering copy-holes to themes, the GA can create a document template 300 that incorporates multiple layouts, all of which can accommodate variable content that is defined by external data.

Rules that trigger the various options in the template can then be formulated, the rules enabling particular options of the theme, for example enabling particular copy-holes and disabling others. These theme options can be described at design time and saved in a section of the PPML/FT template 300, hereby referred to as the 'Data_Mapper'.

Since the theme options are defined as design-time, there is no need for the GA to bind real data with the theme options in order to produce a final document for exporting to print.

Purely by way of an example, one can envisage the design of a document to promote the sale of product with a number of options including:

the product has a minimum price guaranteed; and the product earns extra points for the store 'loyalty' card.

These options can be considered in isolation or they can be applied together.

Figure 5:
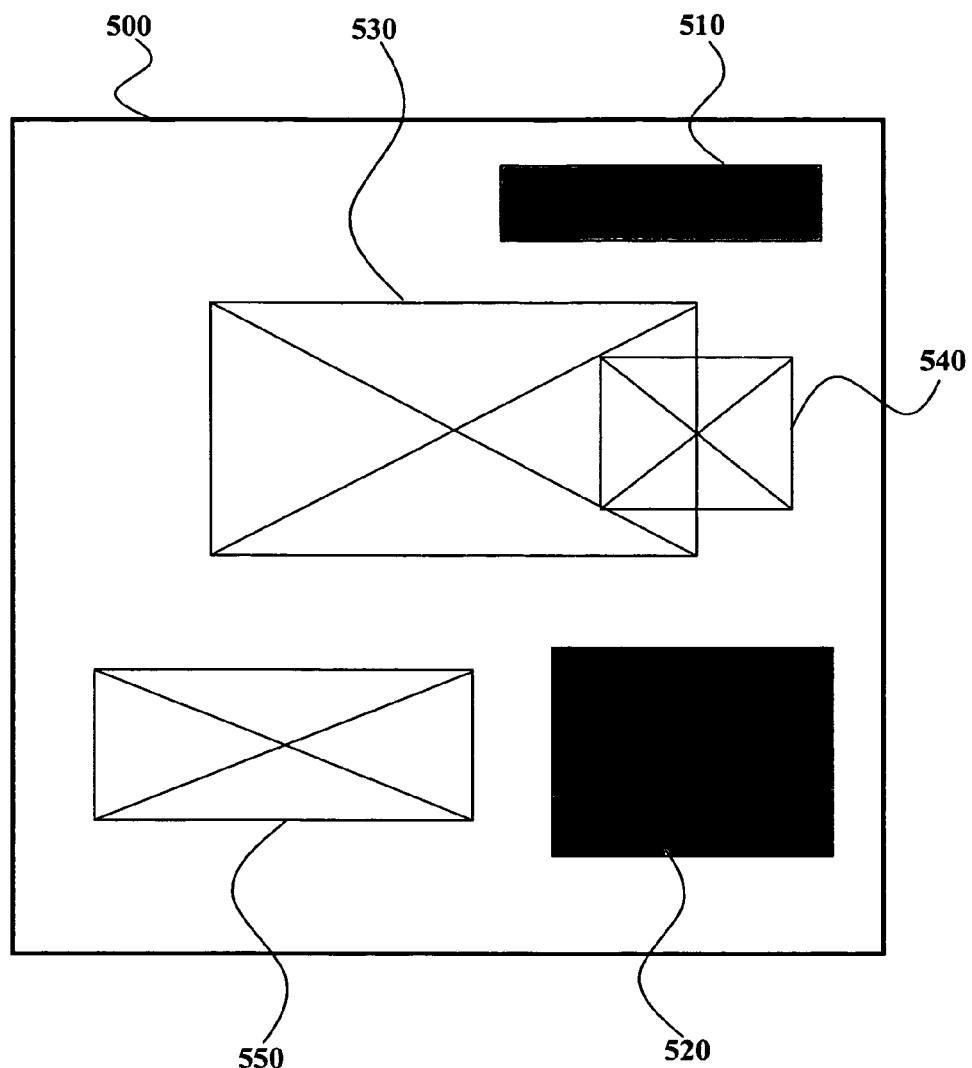
FIG. 5 shows the concept of a template defining multiple document versions, the template includes a layout of document portions and information relating to template options that define document versions in response to input selection data, in accordance with an exemplary embodiment.

Referring to FIG. 5, the exemplary methods and arrangements make it possible to include the extra information about the product in a single document template 500 without requiring all content 510, 520, 530, 540, 550 of the document to be present in the final output document.

The document template 500 comprises a layout of fixed content sections 510, 520 and copy-holes 530, 540, 550. The centered copy-hole 530 defines the location of the product image. The copy-hole 540, located at the right hand side of the template 500, defines the location of an image designed for the right side of the document and is registered to a theme named 'Right' using an <xsl:choose> construct as previously described. The copy-hole 550, at the lower left of the document template 500, defines the location of an image designed for the lower left side of the document and is registered to a theme named 'Left', again using an <xsl:choose> construct.

To reflect the product options, the GA may wish to include particular images within specific copy-holes 530, 540, 550 of the document template depending on what product options are applicable. For example, if the product earns extra points for the store 'loyalty' card and has a minimum price guaranteed then it is required that the 'Points' content is located on the right hand side of the document so that price guarantee content can also be included. Furthermore, if the product earns extra points for the store 'loyalty' card but does not have a minimum price guaranteed it is required that the 'Points' content is located on the left hand side of the document. This demonstrates that the dynamic theme can involve evaluation of multiple fields to elaborate where the 'Points' content needs to be positioned.

A specific example highlighting the expression of the rules within the 'Data_Mapper' is presented as follows:

```
<xsl:template name="Points">
<xsl:param select="." name="record" />
```

```
        <newxsl:choose
          xmlns:newxsl=http://www.w3.org/1999/XSL/Transform>
        <newxsl:when test="ExtraPoints > '0' and
          MinPrice = 'yes'">Right</newxsl:when>
        <newxsl:when test="ExtraPoints > '0' and
          MinPrice = 'no'">Left</newxsl:when>
          <newxsl:choose>
        <xsl:template>
```

The above code defines the requirements of 'Extrapoints' and 'MinPrice' in order for Points to take a particular value in order to match the product options designed by the GA in the above example. In more detail, if the value 'Extrapoints' is greater than zero and 'MinPrice' is yes then 'Points' is attributed the value of 'Right'. This value may then be used to choose between the theme options by utilising the <xsl:choose> construct as described earlier.

Using the 'Data_Mapper', the above approach exploits the separation between the document template 500 and the external data. The GA can create a document template 500 that incorporates multiple layouts, all of which can accommodate variable content that is defined by external data and theme rules.

Furthermore, it can be possible for the GA to temporarily enable or disable some of the copy-holes, thus providing means of visualizing particular document layouts at design time without binding external data to the template to create a final document. The operation of merging data with the document template, to create documents with variable content in response to the data, can now be executed at post-design time.

It has been demonstrated how a plurality of copy-holes may be optional while also being linked with different variables. Above, the positioning of the 'Points' content is related to both the existence of reward points and price guarantee or a particular product. By simply grouping copy-holes associated with each theme option, the dynamic theme option can correctly enable or disable all of the "linked" copy-holes from the design.

The exemplary method and arrangements herein can provide basic dynamism to a design template, agglomerating into a single template many variants that otherwise will require different templates. One advantage is in the reduction of the number of templates and the resultant alleviating of concerns associated with multiple updates.

Even though the examples above have been presented in the context of a retail market application, it is simple to foresee the invention applied to a variety of business segments where document templates for VDP may be desired. Furthermore, use of the methods and arrangements provided here may be extended to document designs of multiple pages.

The methods and arrangements may be implemented as a GA tool to represent documents composed by computer based design software such as Quark xPress and Adobe InDesign, or the like. Further modification can also enable the methods and arrangements to be incorporated into existing VDP software and systems.

Those skilled in the art will realise that the above embodiments are purely by way of example and that modification and alterations are numerous and may be made while retaining the teachings provided herein.

What is claimed is:

1. A method of generating a variable-data printing document template comprising:
  producing, by a computer, the template that is in a computer-readable format, wherein the template comprises a layout of document portions, wherein the document portions comprise at least a first group of one or more variable portions on a page and a second, different group of one or more variable portions on the page, and wherein each of the variable portions contains content which is variable;
  defining a plurality of themes associated with the template, wherein a first of the themes corresponds to the first group of one or more variable portions, and a second of the themes corresponds to the second group of one or more variable portions, wherein the plurality of themes are associated with different layers to enable different ones of the groups of one or more variable portions to be viewed by selecting different layers; and
  temporarily switching on or off selected ones of the different layers during design of the template to allow a user to visualize a selected one of the first and second groups on a display unit with the other one of the first and second groups switched off,
  wherein a document is for generation from the template in response to input selection data which causes selection of one of the plurality of themes to cause a corresponding one of the first and second groups of one or more variable portions to be enabled in the document.

2. A method as claimed in claim 1 wherein at least one variable portion does not contain any content in response to the input selection data.

3. A method as claimed in claim 1 wherein the generation of the document from the variable-data printing document template in response to the input selection data is based upon rules that specify one of the themes in response to the input selection data.

4. A method as claimed in claim 1 wherein the variable-data printing document template is represented as a Personalized Print Markup Language Template (PPML/T).

5. A method as claimed in claim 1 wherein the input selection data comprises data according to an Extensible Markup Language (XML).

6. A method as claimed in claim 1 wherein a location or size of at least one of the document portions is variable in response to the input selection data.

7. A method as claimed in claim 1, wherein one of the first and second groups associated with one of the themes not selected by the input selection data is disabled such that the disabled group of one or more variable portions do not appear in the document.

8. A method as claimed in claim 1, further comprising:
  switching off the selected layer and switching on another one of the layers during design of the template to allow the user to visualize the other one of the first and second groups on the display unit.

9. A method as claimed in claim 1, further comprising:
  registering, using code, the first group of one or more variable portions with the first theme; and
  registering, using the code, the second group of one or more variable portions with the second theme.

10. A method as claimed in claim 1, wherein a variable portion of the first group overlaps on the page with a variable portion of the second group.

11. A method of generating a document for printing, the document comprising one version of a variable-data printing document template which defines multiple document versions and in which each document version is selectable in response to input selection data, the method comprising:
  generating, by a computer, the document template, by:
    defining a layout of document portions in the document template, wherein the document portions comprise plural different groups of variable portions, each of the variable portions containing content which is variable, wherein at least two of the plural groups of variable portions are provided on a particular page of the document;

associating the plural groups of variable portions with corresponding ones of the multiple document versions, each of the document versions comprising a unique corresponding combination of the document portions, and indicating desired variable content of the corresponding group of variable portions;

associating different layers with the corresponding multiple document versions;

temporarily activating or deactivating selected ones of the different layers during design of the document template to allow a user to visualize a selected one of the plural groups of variable portions on a display unit with other one(s) of the plural groups deactivated; and generating the document for printing by providing input selection data to the document template to select one of the document versions, wherein the group of one or more variable portions associated with the selected document version is enabled in the document.

12. A method as claimed in claim 11 further comprising:
defining rules to select one of the document versions in response to the input selection data.

13. A method as claimed in claim 11, wherein one of the plural groups associated with one of the document versions not selected by the input selection data is disabled such that the disabled group of one or more variable portions does not appear in the document.

14. A method as claimed in claim 11, further comprising deactivating the selected layer and activating another one of the layers to visualize another one of the plural groups of variable portions on the display unit.

15. A method as claimed in claim 11, wherein a variable portion of a first of the at least two groups overlaps on the page with a variable portion of a second of the at least two groups.

16. A system, comprising:
a processor configured to:
receive a template definition that defines a variable-data printing document template and that comprises a layout of document portions, wherein the document portions comprise at least a first group of one or more variable portions on a page and a second group of one or more variable portions on the page, wherein each of the variable portions contains content which is variable;

define a plurality of themes in the template definition, wherein a first of the themes corresponds to the first group, and a second of the themes corresponds to the second group, wherein the plurality of themes are associated with different layers to enable different ones of the groups of one or more variable portions to be viewed by selecting different layers;

temporarily switch on or off selected ones of the different layers during design of the document template to allow a user to visualize a selected one of the first and second groups on a display unit with the other one of the first and second groups switched off; and provide to a printer the document template from which a document is generated in response to input selection data that causes selection of one of the themes to cause a corresponding one of the first and second groups of one or more variable portions to be enabled in the document.

17. A system as claimed in claim 16, further comprising a printer, which is adapted to receive the input selection data to select one of the themes, and to generate from the input selection data and the document template the document.

18. A system as claimed in claim 16, wherein a variable portion of the first group overlaps on the page with a variable portion of the second group.

19. A non-transitory computer readable medium storing instructions that upon execution by at least one processor cause the at least one processor to:
produce a template that is in a computer-readable format, wherein the template comprises a layout of document portions, wherein the document portions comprise at least a first group of one or more variable portions and a second, different group of one or more variable portions, and wherein each of the variable portions contains content which is variable;

define a plurality of themes associated with the template, wherein a first of the themes corresponds to the first group of one or more variable portions on a page, and a second of the themes corresponds to the second group of one or more variable portions on a page, wherein the plurality of themes are associated with different layers to enable different ones of the groups of one or more variable portions to be viewed by selecting different layers; and temporarily switching on or off selected ones of the different layers during design of the template to allow a user to visualize a selected one of the first and second groups on a display unit with the other one of the first and second groups switched off, wherein a document is for generation from the template in response to input selection data which causes selection of one of the plurality of themes to cause one of the first and second groups of one or more variable portions to be enabled in the document.

20. A computer readable medium as claimed in claim 19, wherein one of the first and second groups associated with one of the themes not selected by the input selection data is disabled such that the disabled group of one or more variable portions do not appear in the document.

21. A computer readable medium as claimed in claim 19, wherein a variable portion of the first group overlaps on the page with a variable portion of the second group.

* * * * *